United States Patent
Pastilha

(10) Patent No.: US 10,351,207 B2
(45) Date of Patent: Jul. 16, 2019

(54) STEPPER EXERCISE SCOOTER AND VEHICLE HOLDER

(71) Applicant: Adelino F. Pastilha, Valhalla, NY (US)

(72) Inventor: Adelino F. Pastilha, Valhalla, NY (US)

( * ) Notice: Subject to any disclaimer, the term of this patent is extended or adjusted under 35 U.S.C. 154(b) by 171 days.

(21) Appl. No.: 15/651,113

(22) Filed: Jul. 17, 2017

(65) Prior Publication Data
US 2018/0037297 A1 Feb. 8, 2018

Related U.S. Application Data

(62) Division of application No. 14/726,508, filed on May 30, 2015, now Pat. No. 9,708,029.

(60) Provisional application No. 62/005,641, filed on May 30, 2014.

(51) Int. Cl.
| | |
|---|---|
| *B62M 1/28* | (2013.01) |
| *B62K 5/02* | (2013.01) |
| *B62M 9/04* | (2006.01) |
| *B62K 3/00* | (2006.01) |
| *B62K 5/00* | (2013.01) |

(52) U.S. Cl.
CPC ............... *B62M 1/28* (2013.01); *B62K 3/002* (2013.01); *B62K 5/02* (2013.01); *B62M 9/04* (2013.01); *B62K 2005/001* (2013.01)

(58) Field of Classification Search
CPC ........... B62M 1/28; B62M 9/04; B62K 3/002; B62K 5/02; B62K 2005/001
See application file for complete search history.

(56) References Cited

U.S. PATENT DOCUMENTS

| | | | |
|---|---|---|---|
| 10,131,398 B1 * | 11/2018 | Chen | ............... B62K 21/08 |
| 2017/0210440 A1 * | 7/2017 | Dragomir | ............... B62K 3/002 |

\* cited by examiner

*Primary Examiner* — Tony H Winner
*Assistant Examiner* — Marlon A Arce
(74) *Attorney, Agent, or Firm* — Erickson Law Group, PC

(57) ABSTRACT

A stepper scooter provides step pads that are connected to a laterally arranged rocker bar assembly. Vertical movement of the step pads causes the rocker bar assembly to reciprocally pivot which translates drive chains which cause rotation of the drive wheel or wheels. The rocker bar assembly comprises two four bar linkages between a center fork and each step pad. An alternate embodiment uses the rocker bar to reciprocally rotate a gear axle which drives a bevel gear arrangement to rotate the drive wheel or wheels via one-way bearings. Another embodiment incorporates a chain and sprocket drive between the bevel gear arrangement and the drive wheel or wheels, wherein the one-way bearings are replaced with a one-way sprocket drive. A stand is provided that is useful with any of the above scooter embodiments. The stand lifts the wheels of the scooter off the ground or floor by supporting a rear sprocket tube of the scooter to render the scooter effectively immobile during use. The scooter can be used as a stationary exercise device.

6 Claims, 8 Drawing Sheets

STEPPER EXERCISE SCOOTER AND VEHICLE HOLDER

This application is a divisional application of U.S. Ser. No. 14/726,508, filed May 30, 2015 which claims the benefit of U.S. Provisional Application 62/005,641, filed May 30, 2014.

BACKGROUND

Human powered, step-propelled scooters are known. These scooters generally use an up and down motion from a human's legs to propel the scooter, such as described in U.S. Pat. No. 5,368,321; U.S. Pat. No. 6,334,838; U.S. Pat. No. 6,402,173; U.S. Pat. No. 6,520,525; U.S. Pat. No. 6,648,355; U.S. Pat. No. 6,716,141; U.S. Pat. No. 6,764,088; U.S. Pat. No. 8,579,769; U.S. Pat. No. 7,581,742; US patent application 2006/0119052; US patent application 2010/0225085; US patent application 2004/0036249; US patent application 2010/0001487; and US patent application 2010/00320716. These documents are herein incorporated by reference to the extent not inconsistent with the present disclosure.

The disclosed scooters use a pivoting motion of the pedals to convert the general up and down motion of the user's legs to rotary power at the rear wheel or wheels of the scooter.

The present inventor has recognized that prior art step-propelled scooters are driven by inclined pedals which tend to elongate the scooter and may require an uncomfortable leg motion or posture by the user during operation.

SUMMARY

Exemplary embodiments of the invention provide methods for propelling a stepper machine and improve existing methods for propelling human powered vehicles, such as scooters. Exemplary embodiments of the invention operate in a more comfortable vertical motion than the traditional angle of operation required by other stepping devices.

An exemplary embodiment of the invention provides step pads that are connected to a laterally arranged rocker bar assembly. Vertical movement of the step pads causes the rocker bar assembly to reciprocally pivot which translates drive chains which cause rotation of the drive wheel or wheels.

Advantageously, the rocker bar assembly comprises two rocker bars that are operatively connected in parallel to a center fork and at each end to step pad connectors for the step pads, forming four bar linkages between the center fork and each step pad. This creates a substantially vertical up and down movement of the stepper pads and a more comfortable movement for the user.

An alternate embodiment uses the rocker bar to reciprocally rotate a gear axle which drives a bevel gear arrangement to rotate the drive wheel or wheels via one-way bearings. Another embodiment incorporates a chain and sprocket drive between the bevel gear arrangement and the drive wheel or wheels, wherein the one-way bearings are replaced with a one-way sprocket drive.

An accessory is provided that is useful with any of the above scooter embodiments as well as other vehicles. A stand for stationary use of the scooter lifts the wheels of the scooter off the ground or floor by supporting a rear sprocket tube to render the scooter effectively immobile during use. The scooter can be used as a stationary exercise device.

Numerous other advantages and features of the present invention will become readily apparent from the following detailed description of the invention and the embodiments thereof, from the claims and from the accompanying drawings.

DETAILED DESCRIPTION

Figure 1:
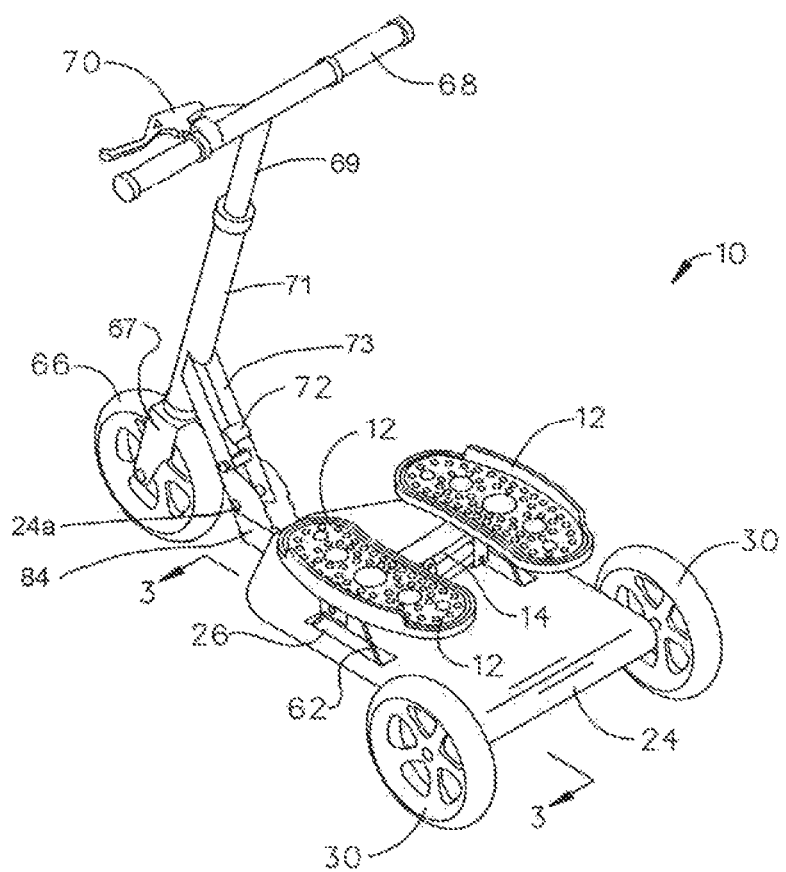
FIG. 1 is a perspective view of an embodiment of a scooter according to the invention.
Figure 2:
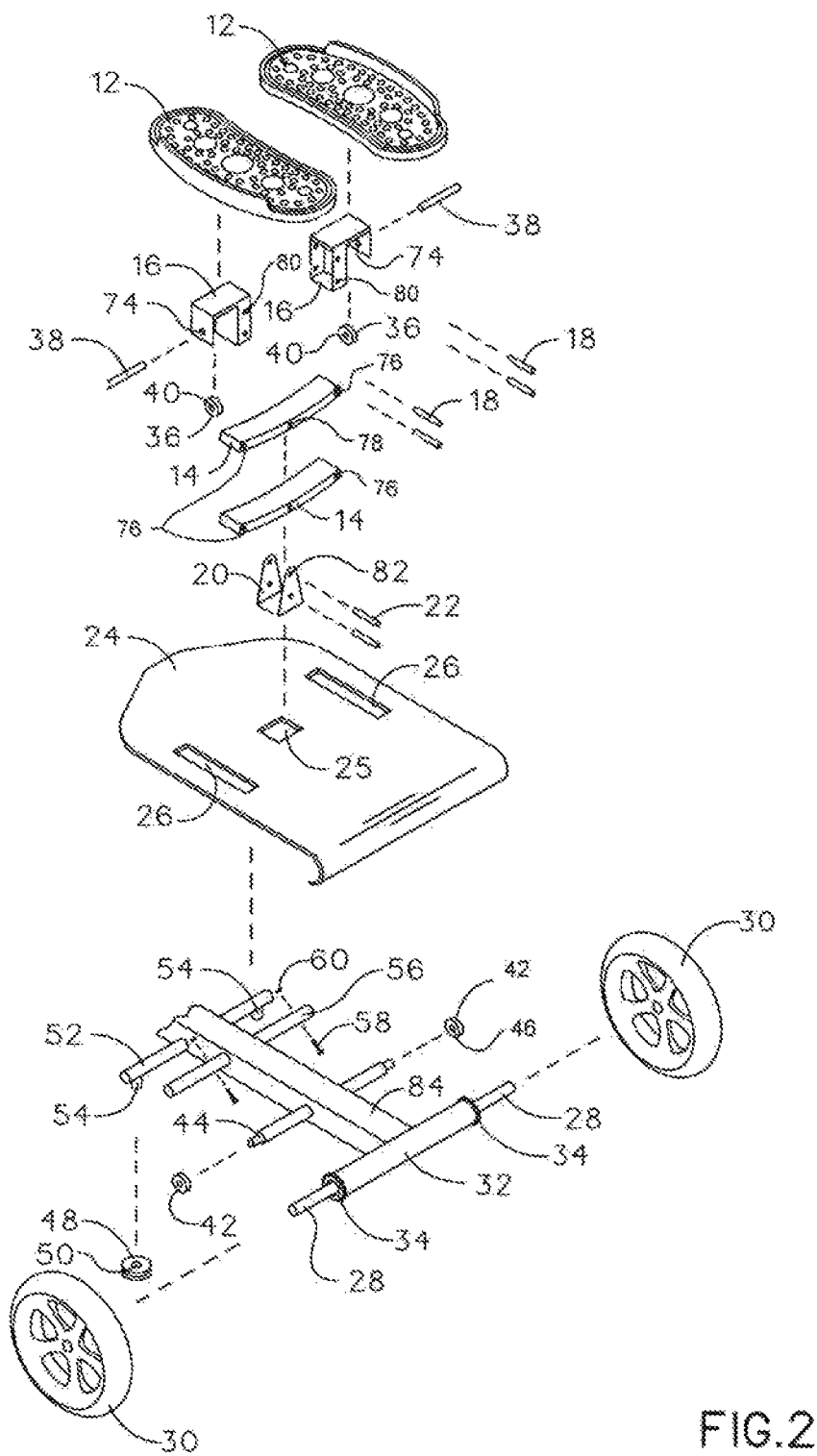
FIG. 2 is a detail exploded view of the scooter of FIG. 1, with some parts removed for clarity.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates by reference U.S. Ser. No. 14/726,508, filed May 30, 2015 and U.S. Provisional Application 62/005,641, filed May 30, 2014.

FIG. 1 illustrates a step-propelled scooter 10. The scooter includes step pads 12 mounted on rocker bars 14 via step pad connectors 16 and outer rocker pivot rods 18. A center rocker fork 20 mounts the rocker bars 14 via center rocker pivot rods 22. A base plate 24 includes a base plate fork slot 25 for passage of the fork 20 and base plate chain slots 26 for passage of left and right drive chains 62 (described below). A center frame member 84 supports the base plate 24 and is connected to a front angled frame member 73.

As shown in FIGS. 2-6, a rear axle 28 mounts rear wheels 30. A sprocket tube 32 surrounds the rear axle rotatably carries sprockets 34. The sprockets 34 have one direction, freewheeling hubs within the sprocket tube to allow the sprockets 34 to drive the axle 28 in the forward direction and to free wheel in the reverse direction and also to freewheel when coasting, i.e., when the user is not stepping but wants the scooter to continue coasting. One direction, freewheeling hubs are well known for bicycles. Examples of bicycle hubs are disclosed in U.S. Pat. Nos. 4,593,799; 3,010,553; 3,709, 341; 8,556,055, herein incorporated by reference to the extent not inconsistent with the present disclosure. The sprocket tube 32 is fixed to the center frame member 84. Center guide wheels 36 are carried on center wheel axles 38 via center guide wheel holes 40 and mounted to the step pad connectors 16. Rear guide wheels 42 are carried on rear guide wheel axles 44 via rear guide wheel holes 46. Horizontal guide wheels 48 having horizontal guide wheel holes 50 are mounted on horizontal wheel rods 52, carried on horizontal wheel posts 54 which extend from the rods 52.

Chain posts 56 receive chain bolts 58 which secure ends of the chains 62 to the posts 56 by chain bolt nuts 60. A cord 64 connects together opposite ends of the chains 62.

A front wheel 66 supports a front of the scooter 10. The front wheel 66 supports a front fork 67 connected to a steering tube 69 which is rotatable within a head tube 71. The steering tube is connected to handlebars 68. A brake 70 is carried by the handlebars 68 and acts on one or more of the wheels in conventional fashion, i.e., urging calipers to pinch a brake disc (not shown). The head tube 71 is mounted to the angled frame member 73. The angled frame member 73 is pivotally attached to the frame member 84 and selectively locked in upright condition as shown in FIG. 1. The frame member 73 includes a folding release handle 72, which when released, allows the angled frame member 73 and head tube 71 to fold down against the base plate 24 about a pin 24*a* for compact storage or transportation of the scooter.

Center wheel axle holes 74 in the step pad connectors 16 receive the axles 38. Outer pivot rod holes 76 and rocker bar holes 80 receive the pins 18 to pivotally connect the rocker bars 14 to the step pad connectors. Center pivot rod holes 78 and rocker fork holes 82 receive pins 22 to pivotally connect the rocker bars 14 to the rocker fork 20.

The center frame member 84 is connected to the sprocket tube 32 at a rear end and to the angled frame member 73 at a front end, and carries the rods 52, chain posts 56, and rear guide wheel axles 44.

On each side of the scooter the two bars 14, the connectors 16 and the center fork 20 and the pinned connections 18, 22, between these four members create a "four bar linkage" that keeps the relative motion of each step pad 12 substantially vertical, wherein the flat upper surface of the step pad 12 remains horizontal.

Figure 3:
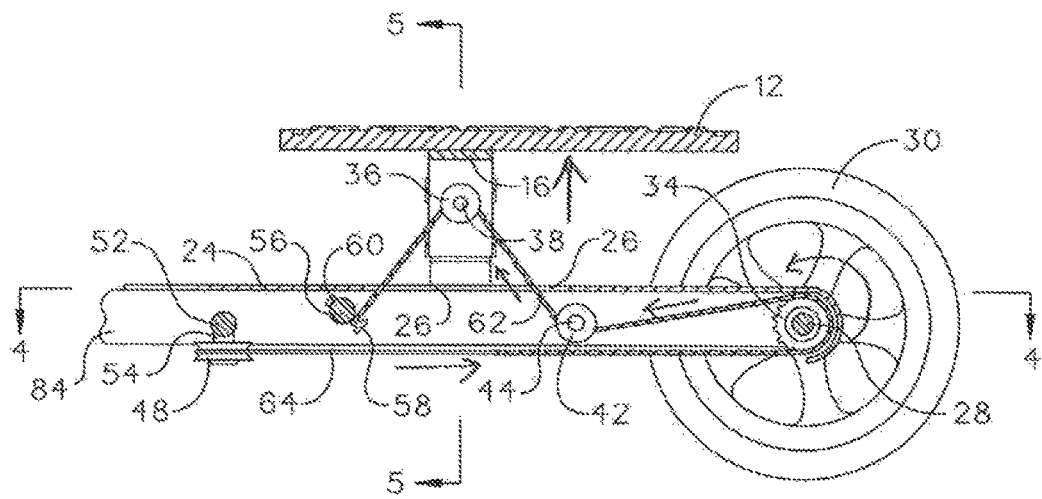
FIG. 3 is a sectional view taken along line 3-3 in FIG. 1.
Figure 4:
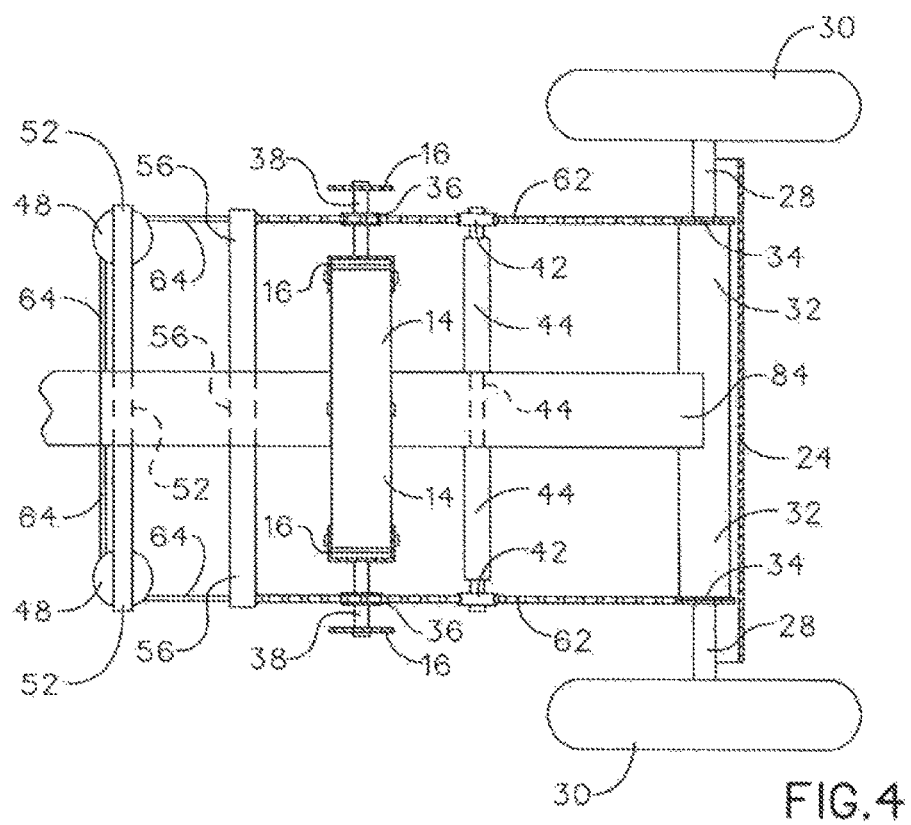
FIG. 4 is a sectional view taken along line 4-4 in FIG. 3.

In operation, when a first side step pad is depressed, the rocker bars 14 force the opposite, second side step pad to rise (FIG. 3). Rising of the second side step pad 12 causes the chain 62 on that side to be drawn beneath the guide wheel 42 and over the top of the sprocket 34 toward the guide wheel 42. This movement of the chain 62 over the sprocket 34 causes the drive wheel 30 to rotate forward (counter-clockwise as shown in FIG. 3). Below the center guide wheel 36, the straight length of the chain 62 and cord 64 are drawn from the pulley 48 toward the sprocket 34.

On the other side of the scooter, the first step pad is lowered and the cord 64 pulls the lower straight run of chain 62 from the sprocket 34 toward the pulley 48 and takes up all slack in the chain caused by the lowering of the step pad 12. However, the sprocket 34 is a one-way transmission sprocket which causes the sprocket 34 to free wheel with respect to the drive wheel in the rear direction (clockwise in FIG. 3).

Thus, the back and forth oscillation of the chains 62 and the one direction transmission sprockets 34 cause the net effect to be a forward only propulsion of the scooter.

Figure 3A:
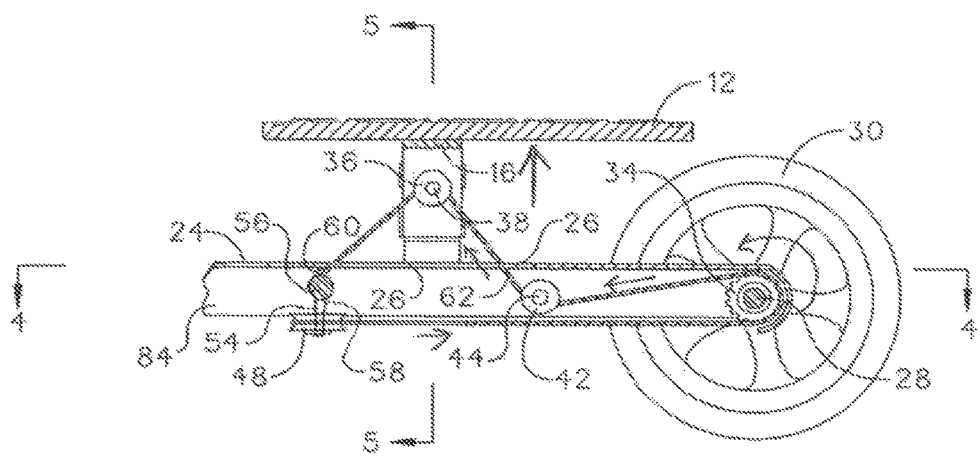
FIG. 3A is a sectional view of an alternate arrangement taken generally along line 3-3 of FIG. 1.
Figure 4A:
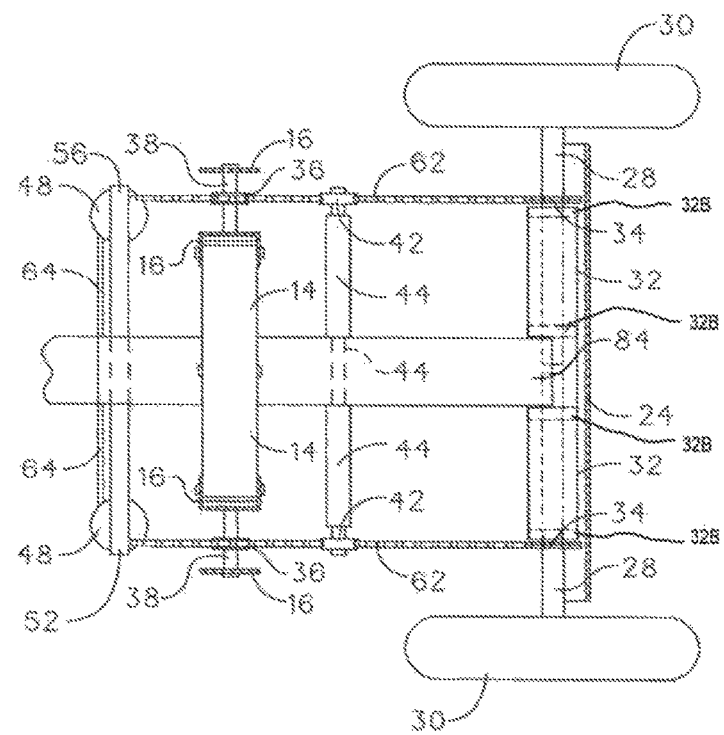
FIG. 4A is a sectional view of an alternate arrangement taken generally along line 4-4 in FIG. 3A.
Figure 5:
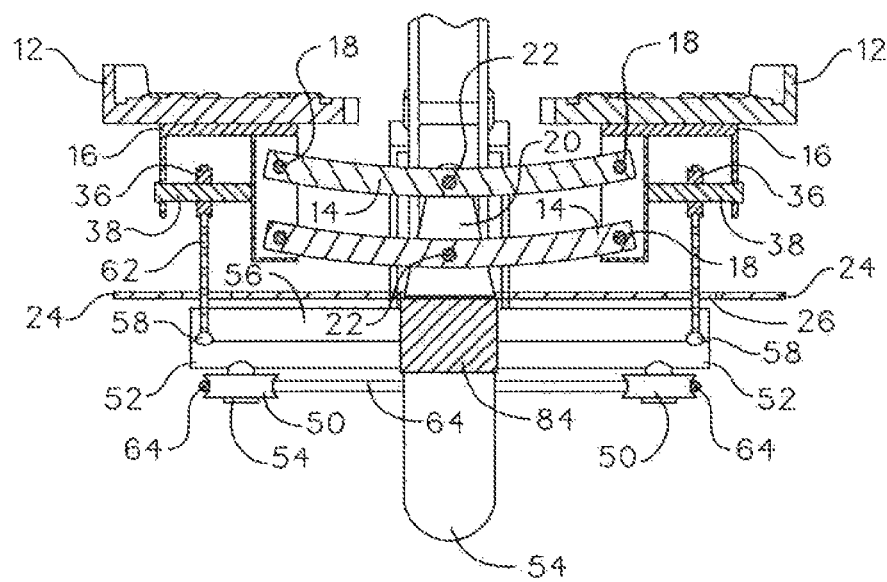
FIG. 5 is a sectional view taken along line 5-5 in FIG. 3.
Figure 6:
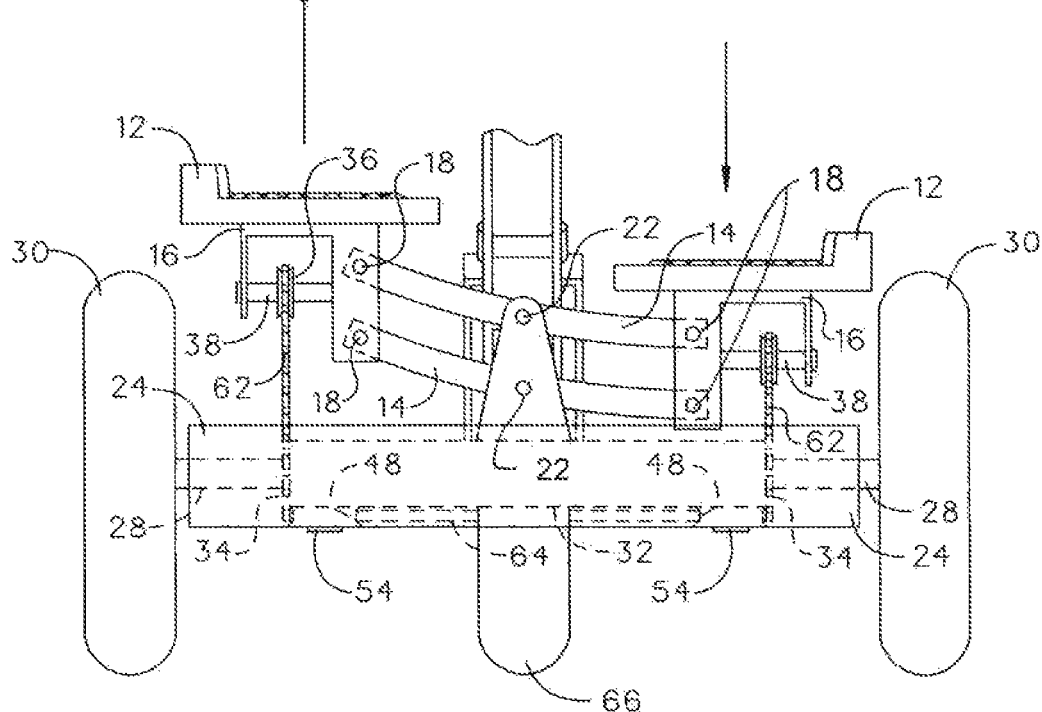
FIG. 6 is a rear view of the scooter of FIG. 1, illustrating the movement of the rocker bars.

FIGS. 3A and 4A illustrate a modification of the structure of FIGS. 2-6 in that the parts 52 and 56 have been combined in function, eliminating the part 52. Horizontal guide wheels 48 are carried on horizontal wheel posts 54 which now extend from the chain posts 56. Chain posts 56 receive chain bolts 58 which secure ends of the chains 62 to the posts 56 by chain bolt nuts 60. FIG. 4A also indicates that bearings 32B have been added to support the axle 28 within the sprocket tube 32.

Figure 7:
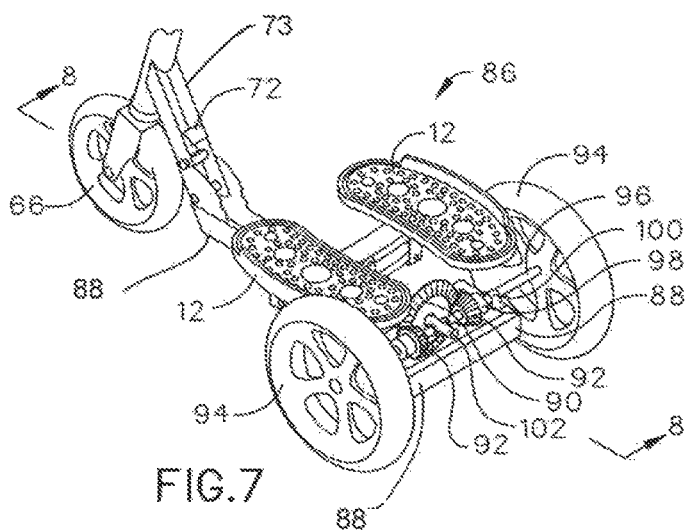
FIG. 7 is a perspective view of an alternate embodiment a scooter according to the invention.
Figure 8:
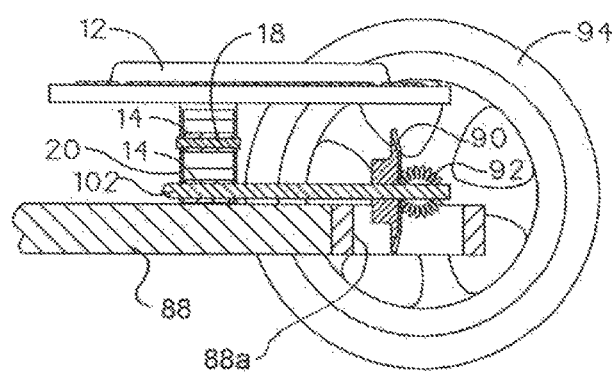
FIG. 8 is a sectional view taken along line 8-8 in FIG. 7.
Figure 9:
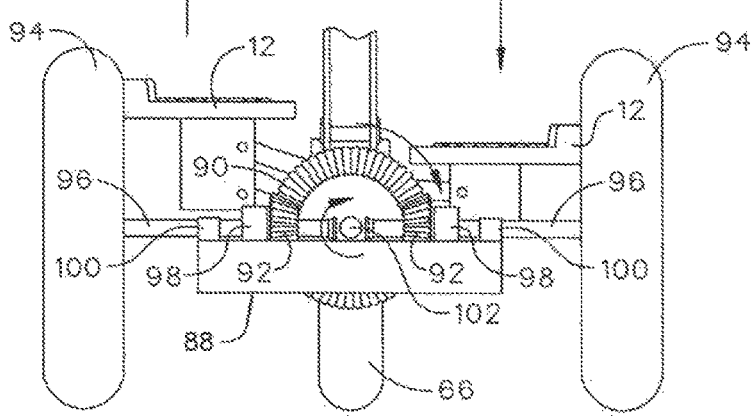
FIG. 9 is a rear view of scooter of FIG. 7, illustrating the movement of the rocker bars, large bevel gear, and bevel gear axle.

FIGS. 7-9 illustrate an alternate step-propelled scooter 86. Like elements carry the same reference numbers. In this embodiment, a large bevel gear 90 and two small bevel gears 92 are meshed to change the rotary axis of the bevel gear 90 degrees to drive alternate rear wheels 94. An alternate rear wheel axle 96 is journaled by one-way bearings 98 and axle guides 100 which are supported by a frame member 88. One-way bearings 98 are described for example in U.S. Pat. No. 7,581,742, or by analogy, the wheel hubs described in U.S. Pat. Nos. 4,593,799; 3,010,553; 3,709,341; 8,556,055, all herein incorporated by reference to the extent not inconsistent with the present disclosure. The frame member 88 would extend forward to connect to the angled frame member 73 as per the prior described embodiment. A bevel gear drive shaft 102 drives the large bevel gear. The drive shaft 102 is fixed to the bottom rocker arm 14, replacing the bottom axle 22 of the prior embodiment, such that rocking motion of the arms 14 causes the axle 102 to reciprocally rotate or rock. The frame member 88 includes an opening 88*a* to accommodate the large bevel gear 90.

Figure 10:
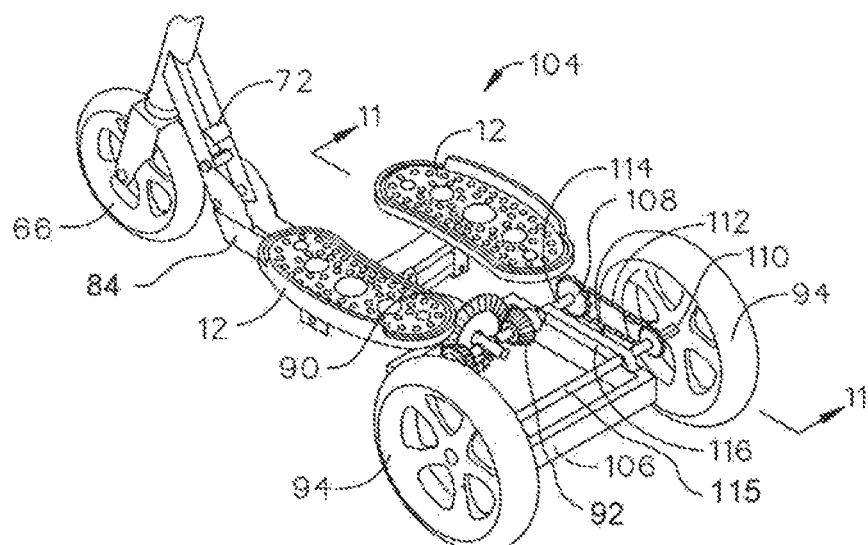
FIG. 10 is a perspective view of a further alternate embodiment a scooter according to the invention.
Figure 11:
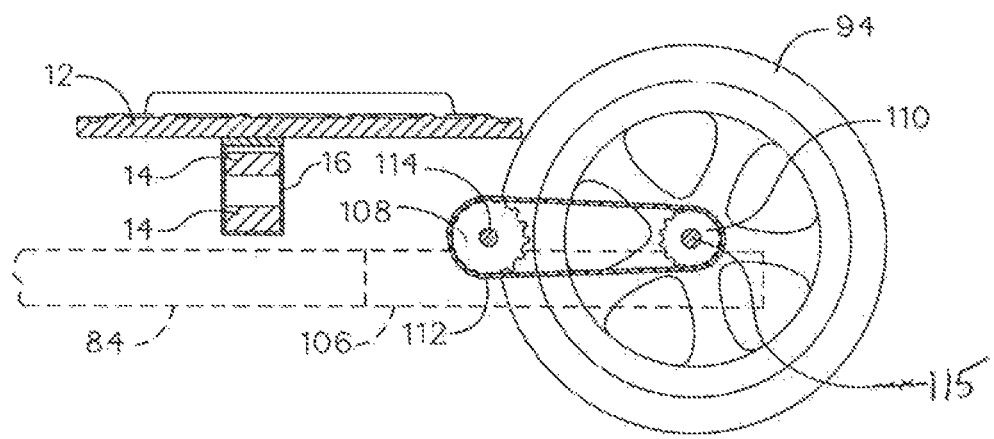
FIG. 11 is a sectional view taken along line 11-11 in FIG. 10.

FIGS. 10 and 11 illustrate a further alternate step-propelled scooter 104. A rear frame 106 supports a right side one-way sprocket 108 that is meshed with a right side driven sprocket 110 via a right side endless chain 112. The one-way sprocket 108 would have a hub for freewheeling and one direction propulsion the same as the prior described sprockets 34. A right side axle 114 is journaled by a right side axle guide 116 and is connected to the output of the right side bevel gear 92 and to the right side sprocket 108. The right side driven sprocket 110 is fixed to an axle 115 that is fixed to the wheels 94 to rotate the wheels for forward movement of the scooter. A left side arrangement (not shown) is provided in mirror image fashion to the right side arrangement. It includes a left side sprocket 108, a left side driven sprocket 110, a left side endless chain 112, a left side axle 114 and a left side axle guide 116. The left side axle is connected to an output of the left side bevel gear 92. The left side driven sprocket 110 is connected to the axle 115 that is fixed to the wheels 94 to rotate the wheels for forward movement of the scooter.

Figure 12:
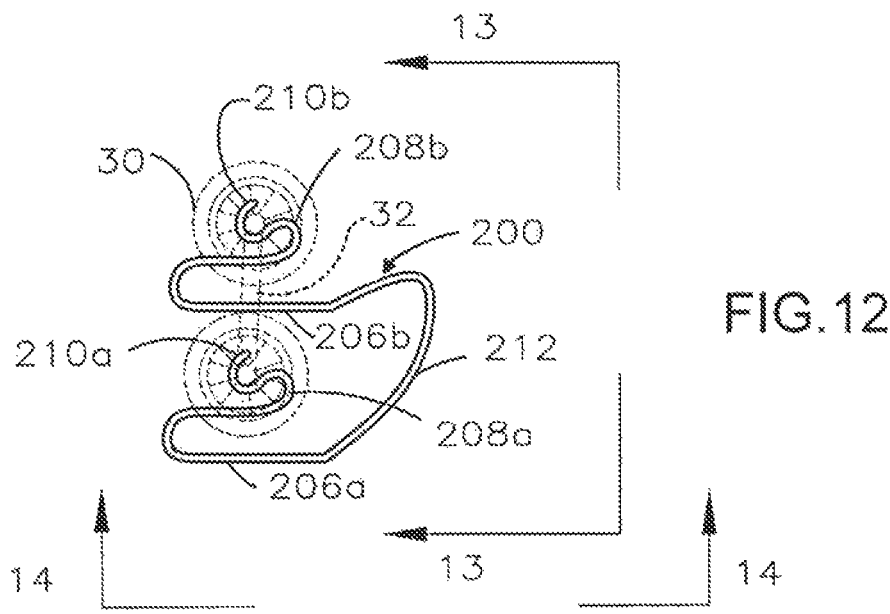
FIG. 12 is a perspective view of an accessory for the scooters of FIGS. 1-11.
Figure 13:
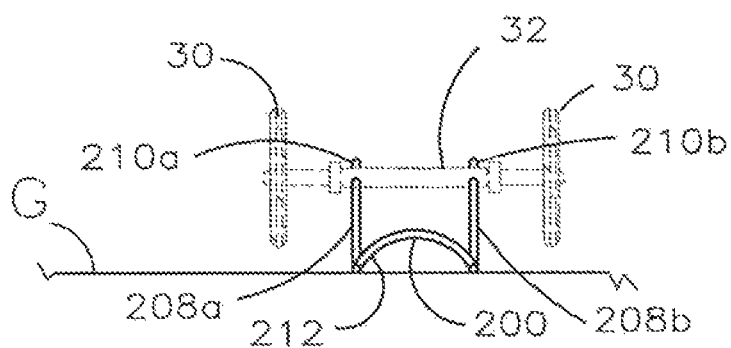
FIG. 13 is an end view of the accessory of FIG. 12 taken along line 13-13 of FIG. 12.
Figure 14:
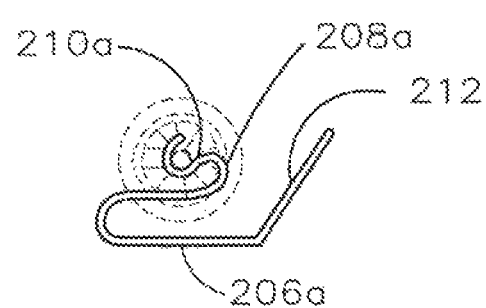
FIG. 14 is a side view of the accessory of FIG. 12 taken along line 14-14 of FIG. 12.

FIGS. 12-14 illustrate an accessory for use with any of the above scooter embodiments. A stand 200 for stationary use of the scooter lifts the wheels 30 of the scooter off the ground or floor G by supporting the sprocket tube 32 to render the scooter effectively immobile during use. In this instance the scooter can be used as a stationary exercise device. The stand 200 is advantageously formed of a bent metal tube. A bent ½ inch to 1 inch steel tube would probably be sufficient. The stand 200 includes linear floor-supported portions 206*a*, 206*b*, extending upward into respective serpentine portions 208*a*, 208*b*, extending forward into respective concave cradle portions 210*a*, 210*b*. A lateral inverted U-shaped brace portion 212 connects the rear of the floor-supported portions 206*a*, 206*b*. The serpentine portions 208*a*, 208*b* allow the floor-supported portions 206*a*, 206*b* to be located in front of, below, and behind the vertical load of the scooter exerted on the cradle portions 210*a*, 210*b*. This provides a more stable support base for the stand 200 to support the scooter. The cradle portions 210*a*, 210*b* are shaped to allow the sprocket tube 32 to be inserted in a forward direction and then move slightly downward to keep the sprocket tube 32 secure in the cradle portions, resisting rearward retraction and dislodgement From the foregoing, it will be observed that numerous variations and modifications may be effected without departing from the spirit and scope of the invention. It is to be understood that no limitation with respect to the specific apparatus illustrated herein is intended or should be inferred.

All references, including publications, patent applications, and patents, cited herein are hereby incorporated by reference to the same extent as if each reference were individually and specifically indicated to be incorporated by reference and were set forth in its entirety herein, to the extent that the references are not inconsistent with the present disclosure.

The invention claimed is:

1. A stepper scooter, comprising:
   a frame;
   a drive wheel rotatably mounted to the frame;
   a laterally arranged rocker bar assembly carried by the frame and having a portion mounted to reciprocally pivot with respect to the frame;
   step pads that are connected to the laterally arranged rocker bar assembly, wherein vertical movement of the step pads causes the portion of the rocker bar assembly to reciprocally pivot, wherein a gear axle is fixed to the portion of the rocker bar assembly to reciprocally rotate about a longitudinal axis thereof during pivoting of the portion of the rocker bar assembly,
   a bevel gear arrangement operatively connected to the gear axle to transmit rotational power from the gear axle;
   at least one one-way rotational device operatively connected between the bevel gear arrangement and the drive wheel, the one-way rotational device transmitting rotational power from the bevel gear arrangement in a forward rotational direction but allowing the bevel gear arrangement to free wheel with respect to the drive wheel in a reverse rotational direction.

2. A stepper scooter according to claim 1, comprising:
   a chain and sprocket drive between the bevel gear arrangement and the drive wheel, wherein the one-way rotational device comprises a one-way sprocket drive.

3. A stepper scooter according to claim 1, wherein the one-way rotational device comprises a one-way bearing.

4. A stepper scooter according to claim 1,
   wherein the at least one drive wheel comprises a pair of drive wheels spaced apart and rotatably mounted to the frame;
   wherein the bevel gear arrangement comprises a main bevel gear and opposing right angle bevel gears;
   wherein the at least one one-way rotational device comprises a pair of one-way rotational devices each operatively connected between one of the right angle bevel gears one of the drive wheels, the one-way rotational devices transmitting rotational power from the right angle bevel gears in the forward rotational direction but allowing the right angle bevel gears to free wheel with respect to the drive wheel when rotating in the reverse rotational direction.

5. A stepper scooter according to claim 4, comprising:
   a chain and sprocket drive between each right angle gear and each drive wheel, wherein each one-way rotational device comprises a one-way sprocket drive at each drive wheel.

6. A stepper scooter according to claim 4, wherein each one-way rotational device comprises a one-way bearing.

* * * * *